(12) United States Patent
Hinderliter

(10) Patent No.: US 12,348,045 B2
(45) Date of Patent: *Jul. 1, 2025

(54) ELECTRIC HYDRAULIC FRACTURING WITH BATTERY POWER AS PRIMARY SOURCE

(71) Applicant: U.S. Well Services, LLC, Houston, TX (US)

(72) Inventor: Brandon Hinderliter, Houston, TX (US)

(73) Assignee: U.S. WELL SERVICES, LLC, Houston, TX (US)

( * ) Notice: Subject to any disclaimer, the term of this patent is extended or adjusted under 35 U.S.C. 154(b) by 50 days.

This patent is subject to a terminal disclaimer.

(21) Appl. No.: 18/234,088

(22) Filed: Aug. 15, 2023

(65) Prior Publication Data

US 2024/0047972 A1 Feb. 8, 2024

Related U.S. Application Data

(63) Continuation of application No. 17/752,135, filed on May 24, 2022, now Pat. No. 11,728,657.

(60) Provisional application No. 63/193,992, filed on May 27, 2021.

(51) Int. Cl.
*H02M 3/335* (2006.01)
*E21B 43/26* (2006.01)
*H02J 3/38* (2006.01)

(52) U.S. Cl.
CPC .......... *H02J 3/381* (2013.01); *E21B 43/2607* (2020.05)

(58) Field of Classification Search
CPC ............................ H02J 3/381; E21B 43/2607
See application file for complete search history.

(56) References Cited

U.S. PATENT DOCUMENTS

| | | | |
|---|---|---|---|
| 2009/0122578 A1* | 5/2009 | Beltran | H02M 3/33523 363/16 |
| 2012/0217067 A1* | 8/2012 | Mebane, III | E21B 44/02 175/57 |
| 2013/0306322 A1* | 11/2013 | Sanborn | E21B 43/2607 166/308.1 |
| 2016/0032703 A1* | 2/2016 | Broussard | E21B 43/2607 166/250.01 |
| 2018/0259080 A1 | 9/2018 | Dale | |
| 2019/0383123 A1 | 12/2019 | Hinderliter | |
| 2021/0032961 A1 | 2/2021 | Hinderliter | |
| 2021/0131248 A1 | 5/2021 | Hinderliter | |

OTHER PUBLICATIONS

International Search Report and Written Opinion mailed Aug. 26, 2022 in corresponding PCT Application No. PCT/US22/30821.

* cited by examiner

*Primary Examiner* — Muhammad S Islam
(74) *Attorney, Agent, or Firm* — Abel Schillinger, LLP

(57) ABSTRACT

A hydraulic fracturing system includes one or more battery trailers having one or more batteries for providing operational energy to one or more connected components. The system also includes a switchgear system and fracturing equipment to receive operational energy from the one or more batteries of the one or more battery trailers to perform one or more fracturing actions.

20 Claims, 10 Drawing Sheets

ELECTRIC HYDRAULIC FRACTURING WITH BATTERY POWER AS PRIMARY SOURCE

CROSS REFERENCE TO RELATED APPLICATIONS

This application is a continuation of U.S. patent application Ser. No. 17/752,135 filed May 24, 2022 titled "ELECTRIC HYDRAULIC FRACTURING WITH BATTERY POWER AS PRIMARY SOURCE," now U.S. Pat. No. 11,728,657 issued Aug. 15, 2023, which claims priority to and the benefit of U.S. Provisional Application Ser. No. 63/193,992 filed May 27, 2021 titled "ELECTRIC HYDRAULIC FRACTURING WITH BATTERY POWER AS PRIMARY SOURCE," the full disclosures of which are hereby incorporated herein by reference in its entirety for all intents and purposes.

BACKGROUND

1. Technical Field

This disclosure relates generally to hydraulic fracturing and more particularly to systems and methods for battery-powered hydraulic fracturing systems. More specifically, batteries may be deployed on one or more trailers, skids, or the like to provide operational power to one or more components of a hydraulic fracturing system as either a primary power source, a backup power source, or combinations thereof.

2. Background

With advancements in technology over the past few decades, the ability to reach unconventional sources of hydrocarbons has tremendously increased. Horizontal drilling and hydraulic fracturing are two such ways that new developments in technology have led to hydrocarbon production from previously unreachable shale formations. Hydraulic fracturing (fracturing) operations typically require powering numerous components in order to recover oil and gas resources from the ground. For example, hydraulic fracturing usually includes pumps that inject fracturing fluid down the wellbore, blenders that mix proppant into the fluid, cranes, wireline units, and many other components that all must perform different functions to carry out fracturing operations.

Usually in fracturing systems the fracturing equipment runs on diesel-generated mechanical power or by other internal combustion engines. Such engines may be very powerful, but have certain disadvantages. Diesel is more expensive, is less environmentally friendly, less safe, and heavier to transport than natural gas. For example, heavy diesel engines may require the use of a large amount of heavy equipment, including trailers and trucks, to transport the engines to and from a wellsite. In addition, such engines are not clean, generating large amounts of exhaust and pollutants that may cause environmental hazards, and are extremely loud, among other problems. Onsite refueling, especially during operations, presents increased risks of fuel leaks, fires, and other accidents. The large amounts of diesel fuel needed to power traditional fracturing operations requires constant transportation and delivery by diesel tankers onto the well site, resulting in significant carbon dioxide emissions.

Some systems have tried to eliminate partial reliance on diesel by creating bi-fuel systems. These systems blend natural gas and diesel, but have not been very successful. It is thus desirable that a natural gas powered fracturing system be used in order to improve safety, save costs, and provide benefits to the environment over diesel powered systems. Turbine use is well known as a power source, but is not typically employed for powering fracturing operations.

Though less expensive to operate, safer, and more environmentally friendly, turbine generators come with their own limitations and difficulties as well. As is well known, turbines generally operate more efficiently at higher loads. Many power plants or industrial plants steadily operate turbines at 98% to 99% of their maximum potential to achieve the greatest efficiency and maintain this level of use without significant difficulty. This is due in part to these plants having a steady power demand that either does not fluctuate (i.e., constant power demand), or having sufficient warning if a load will change (e.g., when shutting down or starting up a factory process).

Space is at a premium at a fracturing site, where different vendors are often working simultaneously to prepare for a fracturing operation. As a result, utilizing systems that have large footprints may be undesirable. However, pressure pumpers still need to be able to provide sufficient pumping capacity in order to complete fracturing jobs.

SUMMARY

The present disclosure is directed to a method and system for providing operational power to electric oilfield equipment using batteries.

In an embodiment, a hydraulic fracturing system includes one or more battery trailers having one or more batteries for providing operational energy to one or more connected components. The system also includes a switchgear system having a common bus for load sharing and fracturing equipment to receive operational energy from the one or more batteries of the one or more battery trailers to perform one or more fracturing actions.

In an embodiment, a hydraulic fracturing system includes one or more battery trailers arranged at a well site where hydraulic fracturing is to be performed, the one or more battery trailers each including one or more batteries to store and provide operational energy at the well site. The system also includes hydraulic fracturing equipment to receive the operational energy from at least the one or more battery trailers. The system further includes a switchgear positioned electrically between the one or more battery trailers and at least some of the hydraulic fracturing equipment, the switchgear to condition the operational energy from the one or more battery trailers and provide the operational energy from the one or more battery trailers at one or more different power levels.

In an embodiment, a method includes providing one or more battery trailers having one or more batteries to provide operational energy to one or more connected components. The method also includes positioning the one or more battery trailers at a charging location, the charging location including at least one of a hydraulic fracturing site or an equipment staging location off-site from the hydraulic fracturing site. The method further includes causing electrical energy to be transmitted to the one or more batteries to increase a charge of the one or more batteries, the electrical energy being provided from one or more of a utility power source or an on-site power generator.

BRIEF DESCRIPTION OF DRAWINGS

Some of the features and benefits of the present disclosure having been stated, others will become apparent as the description proceeds when taken in conjunction with the accompanying drawings, in which.

Figure 1:
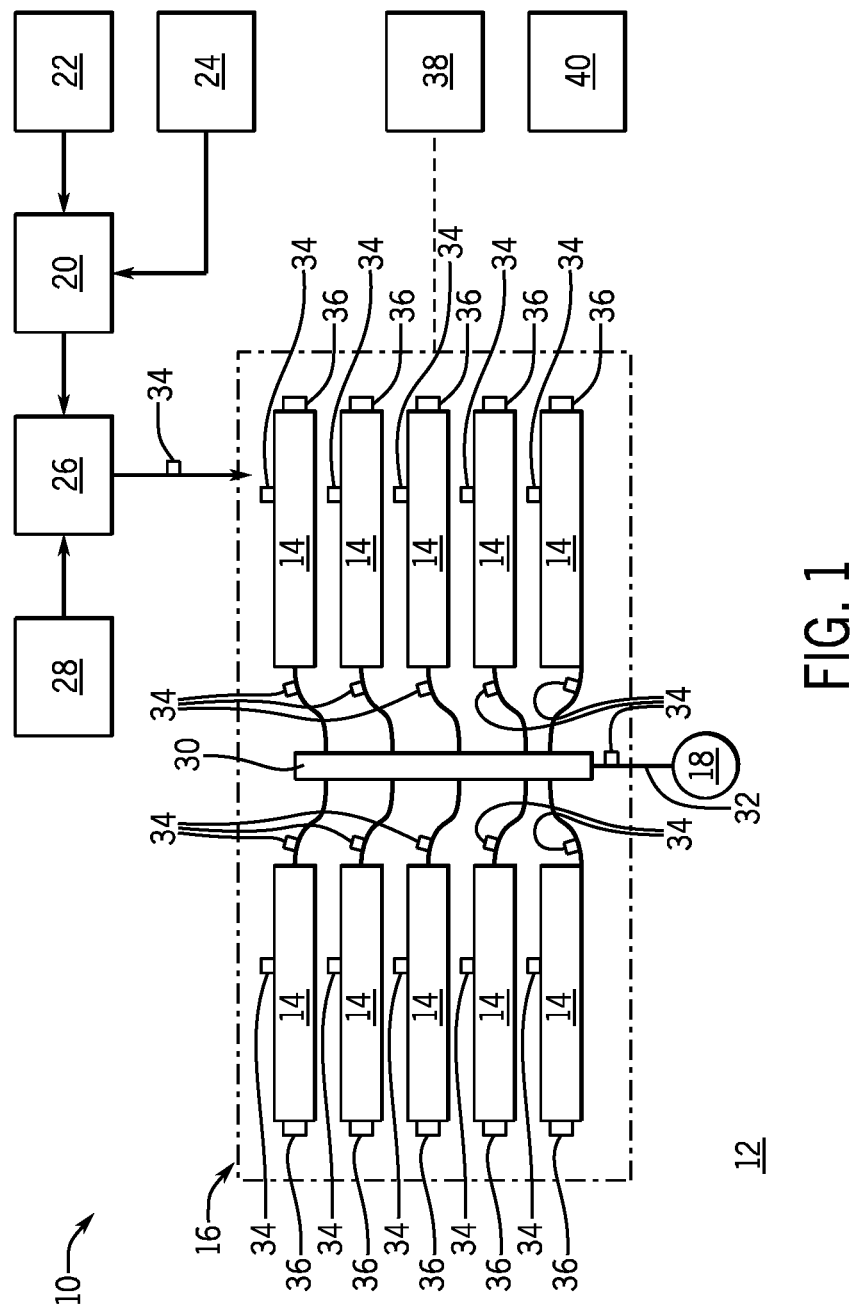
FIG. 1 is a schematic plan view of an embodiment of a fracturing operation, in accordance with embodiments of the present disclosure.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION

Some oilfields have very strict emissions standards and reporting requirements. Many of these hydraulic fracturing operations are "conventional wells," where the wells are vertical only, low pressure, low fluid rate, and only have a few numbers of fracturing stages per well. Many conventional wells have two to four frac stages, 3000 psi max, and 30 bpm max; whereas some shale wells can have up to 60 stages each, require up to 15,000 psi to fracture, and require over 100 bpm of slurry rate in some cases. The equipment and horsepower requirements are drastically lower, around 2,000 HHP to 3000 HHP for conventional wells instead of 15,000 HHP to 25,000 HHP or more for shale wells.

The present technology provides a battery system, which may be trailer mounted, capable of use on electric shale fleets to provide supplemental power or emergency power, and/or to act as a primary power source to fracture one or more stages of conventional wells. These battery systems can provide up to about 2 to 4 MWHrs of capacity depending on battery and inverter specifications. This technology allows an operator to rig up on a well site with a battery system, one or two frac pumps, and a blender, and to perform operations without any local emissions. This reduces reporting requirements as well as damage to the local environment.

The battery systems can be recharged offsite on a local utility grid that utilizes power being generated by all the efficiencies of large permanent power plants with emission controls. The present technology can also reduce equipment noise, as electric equipment is quieter and there need be no generator on site. The technology of the present application also reduces rig up time relative to existing diesel equipment, since there may be no generator set up or on site fueling. Electric equipment is also more compact, and it may be possible to fit all the required pumping power onto a single trailer instead of needing two or three in the case of diesel power.

There are several new and unexpected features of the present technology. For example, in the case of a trailer mounted battery system, the trailer can be mobile and compact. Most of all the required equipment, e.g., battery, inverter, transformers, and heating and cooling components, can fit onto a single mobile trailer with dimensions as compact as 8.5 feet wide by 53 feet long, by 13.5 feet high. Inside of that compact footprint, the battery system of the present technology can have a 3 MW output power (implying a 3 MW inverter system with 3 MW rated transformer) or more and an energy storage capacity of up to 3 MW-Hrs or more. Different types of batteries could provide more power storage on a single trailer. Or conversely, if a smaller trailer size is preferable, such as 48 feet, 40 feet, or 36 feet, less battery storage might be used to reduce size such as 2 MW-hrs or 1.5 MW-hrs of capacity. In such an embodiment that transformer size can be the same.

Another new aspect of the present technology is an integrated switchgear. At least one input breaker for charging can be included, as well as 5 or more output breakers at a lower amperage for supplying power to frac equipment. This integration allows for the elimination of a separate switchgear trailer, and further reduces the equipment footprint.

Some embodiments of the technology can include battery trailers with a separate switchgear trailer. This design might be advantageous in certain circumstances to decrease trailer size, and to allow multiple battery trailers to power a single fleet. This is desirable if larger fracturing stage designs are being used, or if the fleet is going to be stimulating multiple wells on a single wellsite. A separate switchgear trailer can mimic the operator's shale equipment. According to this embodiment, the switchgear trailer can have a minimum of two input breakers and a minimum of 5 output breakers. The switchgear trailer can be physically separate from the battery trailer. In this case the battery trailer may need only a single input and a single output breaker, or a single breaker that is used for charging and discharging. Equipment of this design would allow changing out battery trailers as they deplete and sending them off to be recharged without disconnecting or deenergizing all the fracturing equipment. A switchgear trailer with multiple input breakers can also allow for an emergency or backup generator to power the equipment if a charged battery trailer is not available.

Another embodiment of the technology allows for utility charging. The battery trailers can be charged either offsite or onsite via connection to a utility grid. A small mobile substation may be required to allow this, or even a nonmobile permanent substation at a local equipment yard could be utilized. In addition, utility power may be available onsite.

Alternatively, a mobile generator, such as a turbine or diesel reciprocating generator, could be used to keep battery trailers charged. This generator could be at the local equipment yard, set up on a nearby site, or even on the same site where fracturing operations are occurring.

One advantage to the present technology is that there are very few or no onsite emissions. If the battery trailers are being recharged offsite or by a utility grid, then there would be no reportable emissions from the hydraulic fracturing equipment. The only emissions would be from transportation equipment such as pickup trucks or tractors.

In embodiments where switchgear and battery equipment shared the same trailer, the battery can be placed in bypass mode like a UPS (uninterruptible power supply), and the switchgear equipment can be utilized for power distribution to the frac equipment. The onboard transformer can be utilized to condition the power (and voltage) to be use by the connected frac equipment. If the utility cannot provide enough power, due to substation or power line size limitations; the utility grid can be used as a trickle charger to continuously charge the battery system while the batteries can discharge full power as needed during the hydraulic fracturing process and recharge in between stages.

In embodiments where the switchgear and battery equipment are on separate trailers (i.e., a split design), all the previous capabilities are possible. In addition, the utility power can directly power the switchgear trailer to be able to power the frac equipment. The battery trailer may not be needed at all or may be needed only as an emergency backup if the utility grid fails.

Some embodiments can include battery power integrated with generator power. This is very similar to the concept discussed above of utilizing utility power with battery power. The same options of using the generator as a trickle charger can be performed. However, in this case, the generator could be treated as standby or emergency power instead of the battery trailer, as the least polluting (emissions and noise) power source would always be the primary power source.

Yet another embodiment of the technology includes a method of using one or more dedicated battery trailers and a dedicated switchgear trailer with a minimum of two input breakers. These input breakers can be for, e.g.: dual battery trailers (or more if there are additional input breakers), a single battery trailer (if job power demand is low enough), one battery trailer and one standby diesel generator, and one battery trailer and a utility grid connection via a mobile substation. Output breakers can be at least five in number to accommodate one to three frac pump trailers, one blender trailer, a control and monitoring datavan, and possible connections for wireline units, electric cranes, or water transfer pumps.

The battery trailers can be swappable as they deplete. Once depleted, they can be sent back to the equipment yard or other nearby site to recharge while a new trailer takes its place onsite and is connected to the switchgear trailer with a common bus. Battery trailer length can be limited to 53 feet or less. The dedicated switchgear trailer can have a common bus for load sharing multiple power sources. These power sources can be battery trailers, generators, or a combination of battery trailers, generators, and/or utility connections.

The switchgear trailer can be very compact in this application, can easily be less than 40 feet long. By way of comparison, many existing shale fracturing switchgear trailers in use today that require 24 output breakers are 60 feet long. This trailer of the present technology would only need five or more output breakers. The input breakers for known shale switchgear trailers are also of a much higher amperage, which would not be required here. Bus work would also be much more compact as amperages would be an order of magnitude less. The trailer of the present technology would be designed to handle a maximum of 10 MW of power distribution, whereas larger known trailers can be designed for up to 60 MW.

FIG. 1 is a plan schematic view of an embodiment of a hydraulic fracturing system 10 positioned at a well site 12. In the illustrated embodiment, pumping units 14 (e.g., pump trucks), which make up a pumping system 16, are used to pressurize a slurry solution for injection into a wellhead 18. The pumping units 14 may include one or more fluid pumps. The pumps may be electric pumps driven by electric motors. An optional hydration unit 20 receives fluid from a fluid source 22 via a line, such as a tubular, and also receives additives from an optional additive source 24, which can alternatively directly supply the blender. In an embodiment, the fluid is water and the additives are mixed together and transferred to a blender unit 26 where proppant from a proppant source 28, as well as additional chemicals, may be added to form the slurry solution (e.g., fracturing slurry) which is transferred to the pumping system 16. The pumping units 14 may receive the slurry solution at a first pressure (e.g., 80 psi to 160 psi) and boost the pressure up to 15,000 psi for injection into the wellhead 18. In certain embodiments, the pumping units 14 are powered by electric motors. It should be appreciated that these pressure ranges are provided by way of example only and are not intended to limit the scope of the present disclosure. While 15,000 psi may generally be referred to as an accepted of expected maximum for most hydraulic fracturing operations, it should be appreciated that the operating pressure may be particularly selected based, at least in part, on the formation being hydraulically fractured. As a result, pressure values may be greater or less than 15,000 psi. By way of non-limiting example, fracturing pressures can be approximately 1,500 psi (conventional wells), approximately 7,500 psi (Marcellus Shale), approximately 9,000 psi (Utica Shale), or may be even greater, such as approximately 12,000 psi for some deeper formations. As such, embodiments of the present disclosure are directed toward pumping units 14 that may be particularly selected to provide a sufficient pressure for fracturing a formation, where that pressure may vary based on formation properties.

After being discharged from the pump system 16, an optional distribution system 30, such as a missile trailer (e.g., manifold trailer), receives the slurry solution for injection into the wellhead 18. The distribution system 30 consolidates the slurry solution from each of the pump trucks 14 and includes discharge piping 32 coupled to the wellhead 18. In this manner, pressurized solution for hydraulic fracturing may be injected into the wellhead 18. It should be appreciated that the distribution system 30 may be omitted in various embodiments where the pumping units may be coupled directly to a wellhead, which may serve as a manifold. As such, the use of the distribution system 30 in FIG. 1 is provided by way of non-limiting example.

In the illustrated embodiment, one or more sensors 34, 36 are arranged throughout the hydraulic fracturing system 10 to measure various properties related to fluid flow, vibration, and the like. In embodiments, the sensors 34, 36 transmit flow data to a data van 38 for collection and analysis, among other things. Furthermore, while not pictured in FIG. 1, there may be various valves distributed across the system. For examples, a manifold (not pictured) may be utilized to supply fluid to the pumping units 14 and/or to receive the pressurized fluid from the pumping units 14.

An electrical power source 40 is shown, which may include turbines, reciprocating engines, generators, switchgear, transformers, battery systems, microgrids, connections to utility power or off-site power generation, and the like. In various embodiments, the power generation system 40 provides energy for one or more operations at the well site. It should be appreciated that while various embodiments of the present disclosure may describe electric motors powering the pumping units 14, in embodiments, electrical generation can be supplied by various different options, as well as hybrid options. Hybrid options may include two or more of the following electric generation options: Gas turbine generators with fuel supplied by field gas, CNG, and/or LNG, diesel turbine generators, diesel engine generators, natural gas engine generators, batteries, electrical grids, and the like. Moreover, these electric sources may include a single source type unit or multiple units. For example, there may be one gas turbine generator, two gas turbines generators, two gas turbine generators coupled with one diesel engine generator, and various other configurations.

In various embodiments, equipment at the well site may utilize 3 phase, 60 Hz, 690V electrical power. However, it should be appreciated that in other embodiments different power specifications may be utilized, such as 4160V or at different frequencies, such as 50 Hz.

Accordingly, discussions herein with a particular type of power specification should not be interpreted as limited only to the particularly discussed specification unless otherwise explicitly stated. Furthermore, systems described herein are designed for use in outdoor, oilfield conditions with fluctuations in temperature and weather, such as intense sunlight, wind, rain, snow, dust, and the like. In embodiments, the components are designed in accordance with various industry standards, such as NEMA, ANSI, and NFPA.

As noted above, it may be undesirable for the power generation system 40 to utilize components with emissions, as these emissions may be reported or otherwise. Accordingly, systems and methods of the present disclosure may incorporate within, or at least partially replace, one or more components of the power generation system 40 with a battery system, which may be trailer/skid/truck mounted, to provide operational power to one or more components at the site 12, such as the pumping units 14, the data van 38, or the like. In at least one embodiment, the battery system receives a charge from an off-site power source. In at least one embodiment, the battery system receives a charge from a grid source that is provided at the site 12. In at least one embodiment, the battery system receives a charge from a local power source, such as one or more components of the electrical power 40. It should be appreciated that "local" refers to receiving the charge at or near the site, and not necessarily the location of the power generator. For example, as noted above, the electrical power source 40 may include one or more connections to a utility grid or another off-site power source that is then used locally. Accordingly, systems and methods may be used to reduce local emissions, among other benefits.

Figure 2:
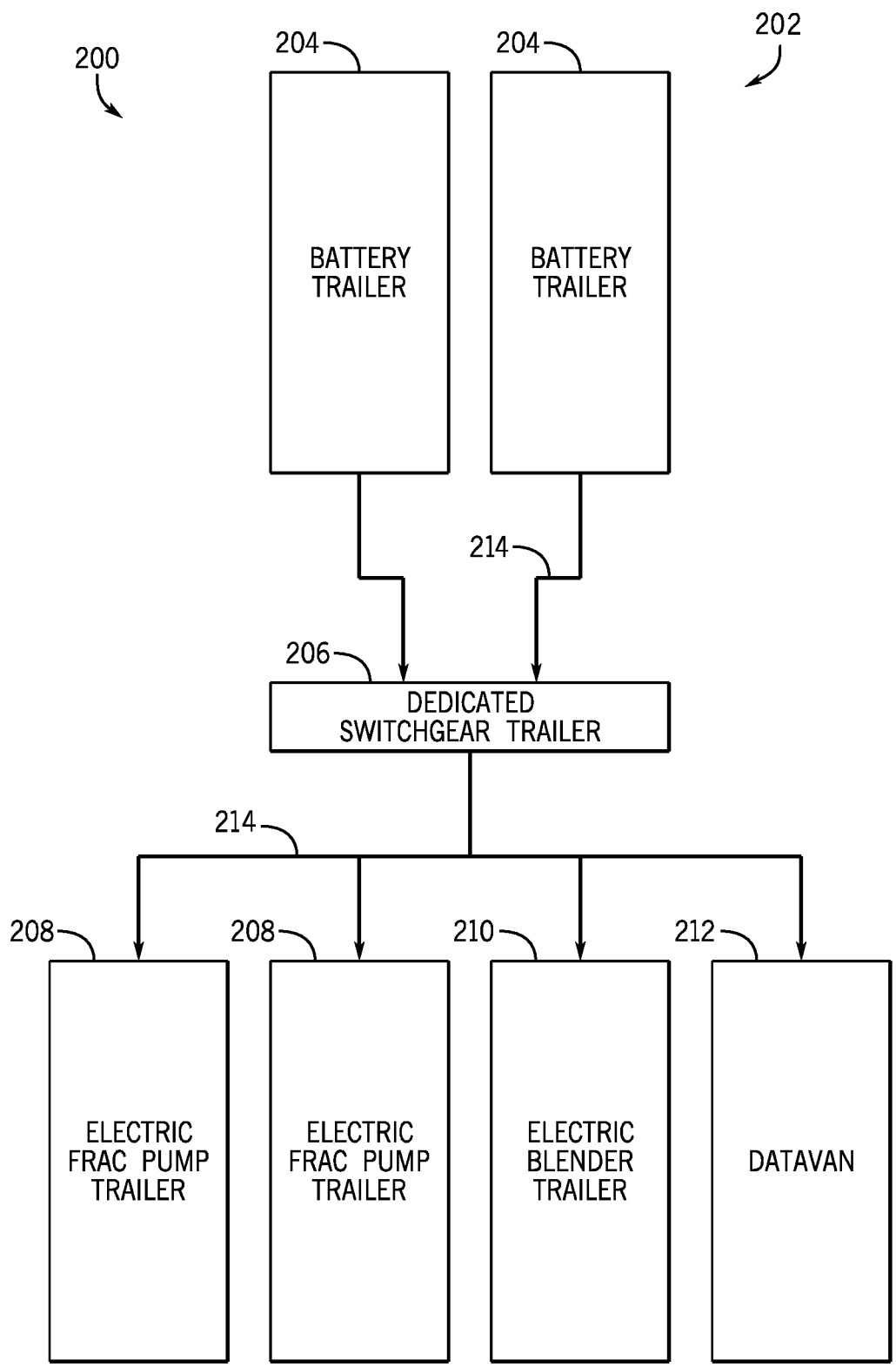
FIG. 2 is a schematic diagram of an embodiment of a fracturing system, in accordance with embodiments of the present disclosure.

FIG. 2 is a schematic diagram of an embodiment of a fracturing system 200 that may utilize one or more components of the present disclosure. In this example, a method of operation may be utilized where only battery power is provided as operational energy for a fracturing operation. For example, no diesel equipment may be arranged onsite, and therefore, there may be no or substantially no emissions reporting requirements. Advantageously, such an arrangement could still provide sufficient HHP, for example the same as an equivalent diesel fleet, without the reporting requirements.

In this example, a battery system 202 includes one or more battery trailers 204, which may have one or more battery packs for providing operational energy to components of the fracturing system 200. It should be appreciated that there may be more or fewer battery trailers 204. For example, the batteries may provide up to about 2 to 4 MWHrs of capacity, which may vary based on battery and inverter specifications, among other considerations. Mounting the equipment on the trailers 204 may permit movement to and from the well site, as well as providing options to quickly rearrangement components, swap out components, and the like. For example, a set of trailers 204 having batteries may be in operation and, when a threshold level of power has been depleted, a trailer with fresh batteries may be provided and swapped for the depleted one. As noted above, various embodiments may provide for trailers 204 having size and/or weight configurations to permit transportation along traditional roadways without special permitting. For example, the trailers 204 may have dimensions of approximately 8.5 feet wide by 53 feet long by 13.5 feet high. Such a footprint may hold battery packs providing approximately 3 MW output power (e.g., battery packs with a 3 MW inverter system and a 3 MW rated transformer). It should be appreciated that more or less capacity may be utilized and that 3 MW is provided by way of example only. Additionally, smaller trailers may also be utilized, such as 48 feet, 40 feet, or 36 feet in length, but in certain embodiments, smaller trailers may lead to reduced capacity, such as approximately 1.5 MWHrs to 2 MWHrs. Various embodiments may also include batteries with storage capacity between 1 MW-hr and 4 MW-hrs for a single trailer. Additionally, embodiments may provide output power of between 3 MW and 8 MW for a single trailer. By way of non-limiting example, a 2 MW-hr battery discharging at 4 MW will be depleted in 30 minutes. If that same battery was discharging at 1 MW instead, it would take 2 hours to deplete.

The illustrated embodiment includes a switchgear trailer 206, which as noted above may utilized trailers with a variety of different sizes, depending on expected operating conditions and/or transport restrictions. Moreover, it should be appreciated that components of the switchgear trailer 206 may be integrated into one or more of the battery trailers 204. The switchgear trailer 206 may also be referred to as a switchgear system and may include an inverter, a rectifier, and a transformer. The inverter turns DC battery power into transmittable AC power. The rectifier converts AC power into DC power for charging battery packs. The transformer is used to change AC power to the appropriate voltage and can also perform some harmonic control.

In this example, cables 214 are used to provide electrical connection between the battery trailers 204 and the switchgear trailer 206. The cables 214 may be standard, known cables that are used to couple components together in the fracturing industry, thereby permitting use systems and methods with existing components without expensive retrofitting operations.

In this example, the switchgear trailer 206 may include at least one input breaker for charging, as well as 5 or more output breakers for a lower amperage for supplying power to fracturing equipment. Various other features may also be incorporated into the switchgear trailer 206, such as emergency or backup capabilities, input connections for alternative power sources, and the like.

As shown, power is output from the switchgear trailer 206 to different fracturing equipment, such as pump trailers 208, a blender trailer 210, and a data van 212. It should be appreciated that these features may share one or more elements with the pumping units 14, blender 26, and data van 38 of FIG. 1. Additionally, there may be more or fewer pump trailers 208, blender trailers 210, and/or data vans 212. For example, the pump trailers 208 may include electric motors to power hydraulic fracturing pumps having a rated horsepower, such as, by way of non-limiting example, 1750 HP to 6000 HP. The pump trailers 208 may be moved to different locations and staged according to various well site layouts. In operation, pumps associated with the pumping trailers 208 may receive a slurry from a blender associated with the blender trailer 210, provide energy to the fluid, and then direct the fluid for injection into a wellbore, where the fluid may be provided with a sufficient pressure to conduct hydraulic fracturing of a rock formation associated with the wellbore.

Systems and methods may provide equipment and capability for an electric fracturing operation where there is no diesel equipment onsite, and therefore there would not need to be any emissions reporting while still allowing the operator to stimulate the well using the same HHP as a diesel fleet would have. Cables that interconnect the equipment can be the same as are used with known larger shale fleets. For example, in some embodiments the cables can be three phase jacketed cables with an integrated ground conductor and ground check conductor for safety.

Battery trailer output and distribution power could be at 25 KV, 13.8 KV, 12.4 KV, 4160V, 720V, 690V, 600V, or 480V. In one or more embodiments, battery pack voltage may be a DC voltage no greater than 2000 V. It should be appreciated that larger or smaller voltages may be utilized in accordance with equipment operational parameters. To keep conventional equipment compatible with the shale equipment of the present technology, the battery trailers and switchgear trailers of the present technology can be designed to output and distribute power at 13.8 KV and rely on transformers integrated onto the frac pumps and blenders to step it down to the required drive voltage. This would also allow operators to use the same cables with smaller conductor sizes.

To reduce space and costs, however, it might be advantageous to design the entire system to operate at a lower voltage, such as 690V, and omit transformers from the design.

Figure 3:
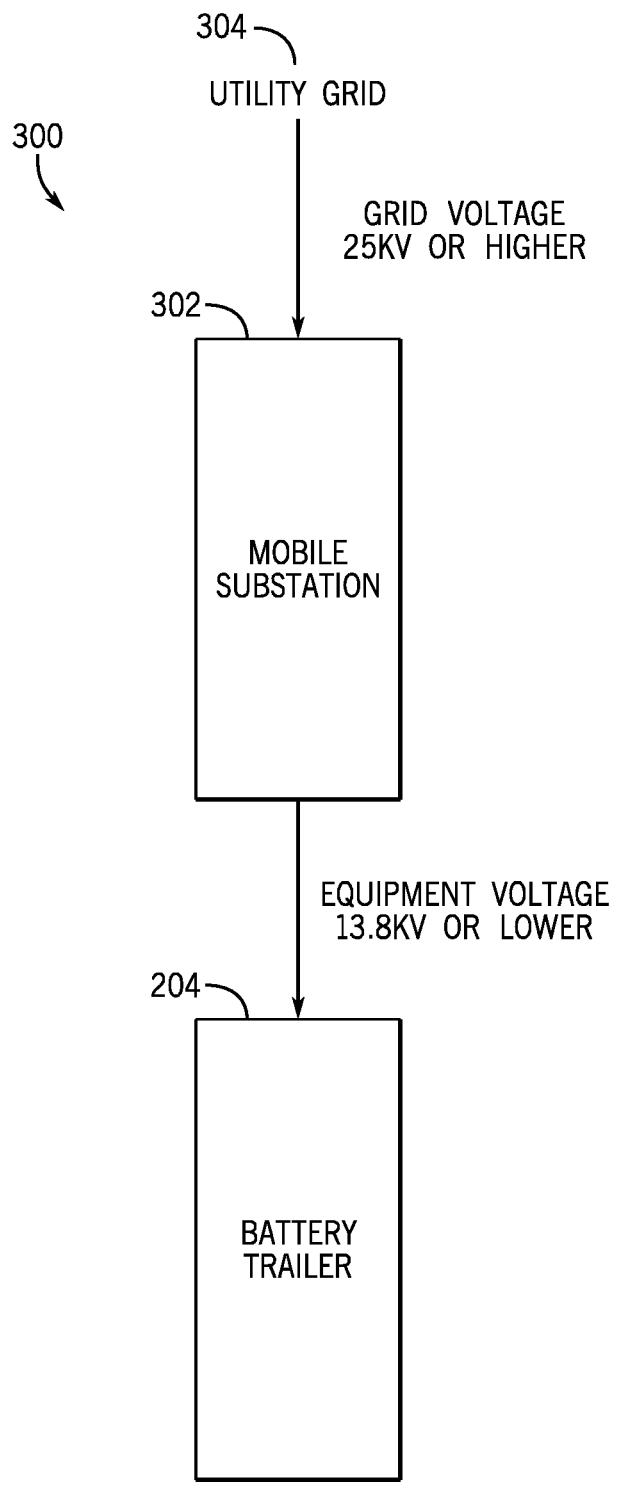
FIG. 3 is a schematic diagram of an embodiment of a charging system, in accordance with embodiments of the present disclosure.

FIG. 3 is a schematic diagram of an embodiment of a charging system 300 for charging mobile battery trailers, such as the battery trailers 204. In this example, a mobile substation 302 is utilized to provide energy for charging the battery trailer 204. As noted above, it should be appreciated that there may be more trailers 204, and moreover, that additional mobile substations 300 may also be used. The mobile substation 302 receives energy from a utility grid 304, which may include transmission devices, such as powerlines and the like. The powerlines may be arranged at the wellsite and a direct connection, and/or a connection with one or more intermediate components, may be formed between the mobile substation 302 and the utility grid 304.

The mobile substation 302 may contain 3-phase connections for connecting to overhead powerlines, filtration for harmonics to keep power clean and in compliance with IEEE 519, and a stepdown transformer for converting the line power, which can be in the range of 25 KV, 69 KV, or 138 KV down to our battery system voltage of 13.8 KV or lower. The battery trailer 204 may be configured to operate at 13.8 KV for the contemplated frac equipment, such as equipment shown in FIG. 2. It should be appreciated that a diesel (or natural gas) generator could also be used to directly charge the battery trailer 204 without the need of a utility connection or substation 302. In this scenario, there can be a step up transformer between the generator and the battery trailer 204 to step up generator voltage from 480V or 600V to 13.8 KV. The mobile substation 302 can also contain more than one output breaker to allow charging of multiple battery trailers at the same time.

One advantage to the present technology is that is can eliminate onsite emissions and allow electric equipment to deploy rapidly and replace the traditionally used diesel equipment. For example, in examples where generators are not used, local emissions will be eliminated or significantly reduced due to the utilization of an existing power source in the utility grid. Furthermore, the mobile substation 302 may be utilized to condition and prepare the power for use by the battery trailer 204. As noted, the battery trailer 204 may operate as a passthrough device, such that power is directly transmitted through the battery trailer 204 or may be utilized to discharge power from the batteries in order to provide operational energy to one or more fracturing components. In at least one embodiment, power may be provided as passthrough up to and until the batteries reach a certain charge level, and then may be switched to battery power until a threshold low charge level is reached. Additionally, in embodiments, a trickle charge may be used to continuously provide charging energy to the batteries as the batteries provide operational energy to various components.

Figure 4:
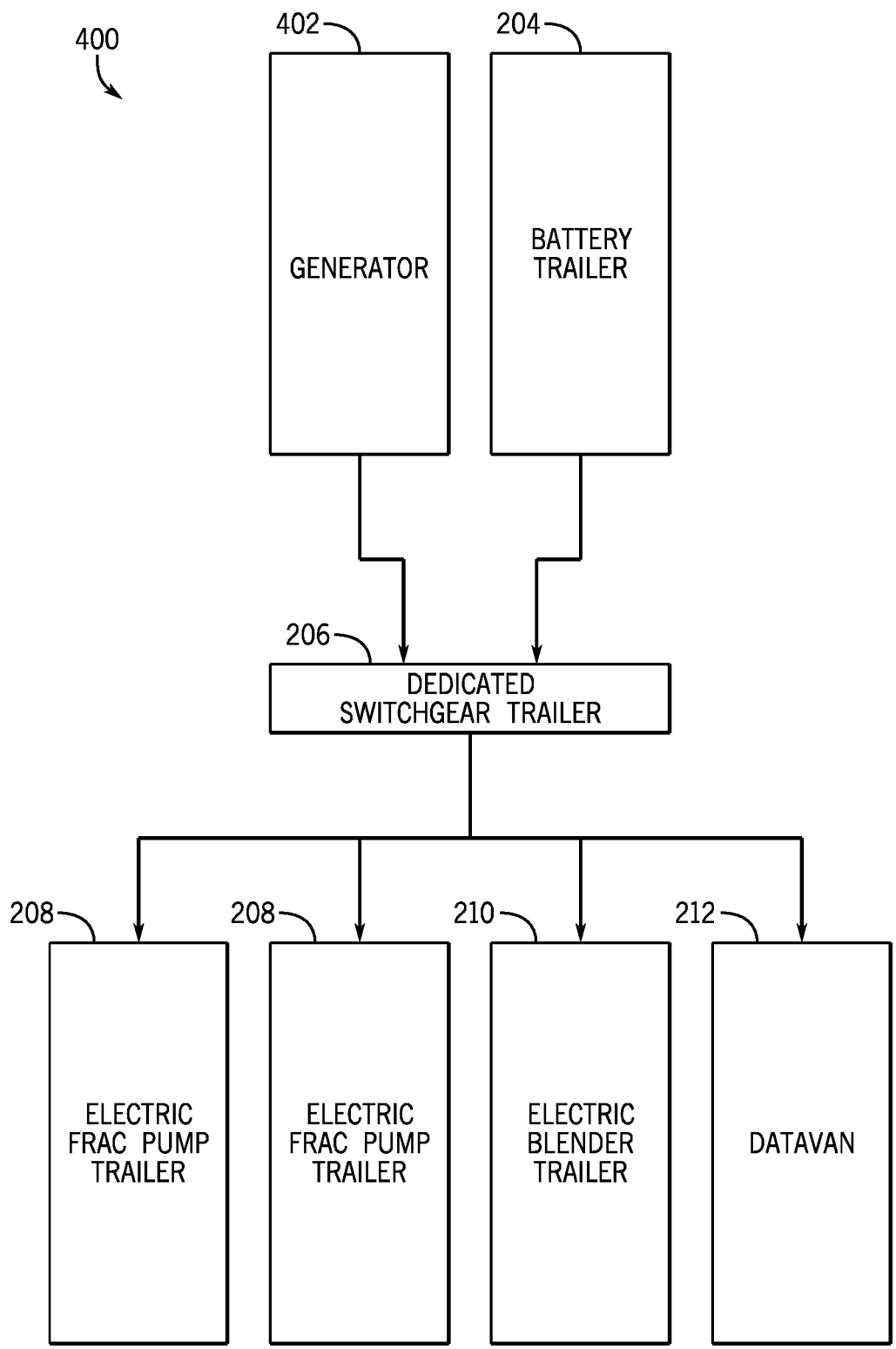
FIG. 4 is a schematic diagram of an embodiment of a fracturing system, in accordance with embodiments of the present disclosure.

FIG. 4 is a schematic diagram of an embodiment of a fracturing system 400, which may be used with embodiments of the present disclosure. The system 400 differs, at least in part, from the system 200 of FIG. 2 in that a diesel generator 402 is provided as a potential power source, which may be utilized to provide operational energy to various components, as a backup supply, to charge the battery trailer 204, or the like.

In at least one embodiment, the battery trailer 204 may be used as a primary power source to provide operational energy to the fracturing equipment, such as the pumping trailer 208, blender trailer 210, data van 212, and various other equipment that may also be located at the well site. In this example, the switchgear trailer 206 is separate from the battery trailer 204, but in various embodiments the switchgear may be integrated into the battery trailer 204 or within any other trailer 208, 210.

Various embodiments may provide for the diesel generator 402 to be used as an alternative or supplemental power source, among other options. For example, the diesel generator 402 may be utilized in place of an additional battery trailer, for example in situations where added power may only be needed for a limited time. Also, the diesel generator 402 may serve as a backup power supply, for example in the event it is difficult or unfeasible to swap out battery trailers 204. Moreover, in at least one embodiment, the diesel generator 402 may be utilized during battery trailer 204 switches, thereby maintaining a power level while still reducing emissions when compared to full diesel systems.

In at least one embodiment, the generator 402 might only be needed in the event of a fracturing stage having higher than expected HHP and drawing more electrical power than expected, or if it is infeasible to swap out battery trailers continuously. In this manner, the generator 402 could be used as: a peaker to supplement the battery trailer 204 during the highest load demand, a charger where it will only be used to recharge the battery system when the capacity runs low, and/or a primary power source if the battery system fails. Accordingly, the use of the diesel generator 402 may provide for an alternative or backup power supply in order to ensure continued operation and reduce a likelihood of work stoppages due to power availability.

Figure 5:
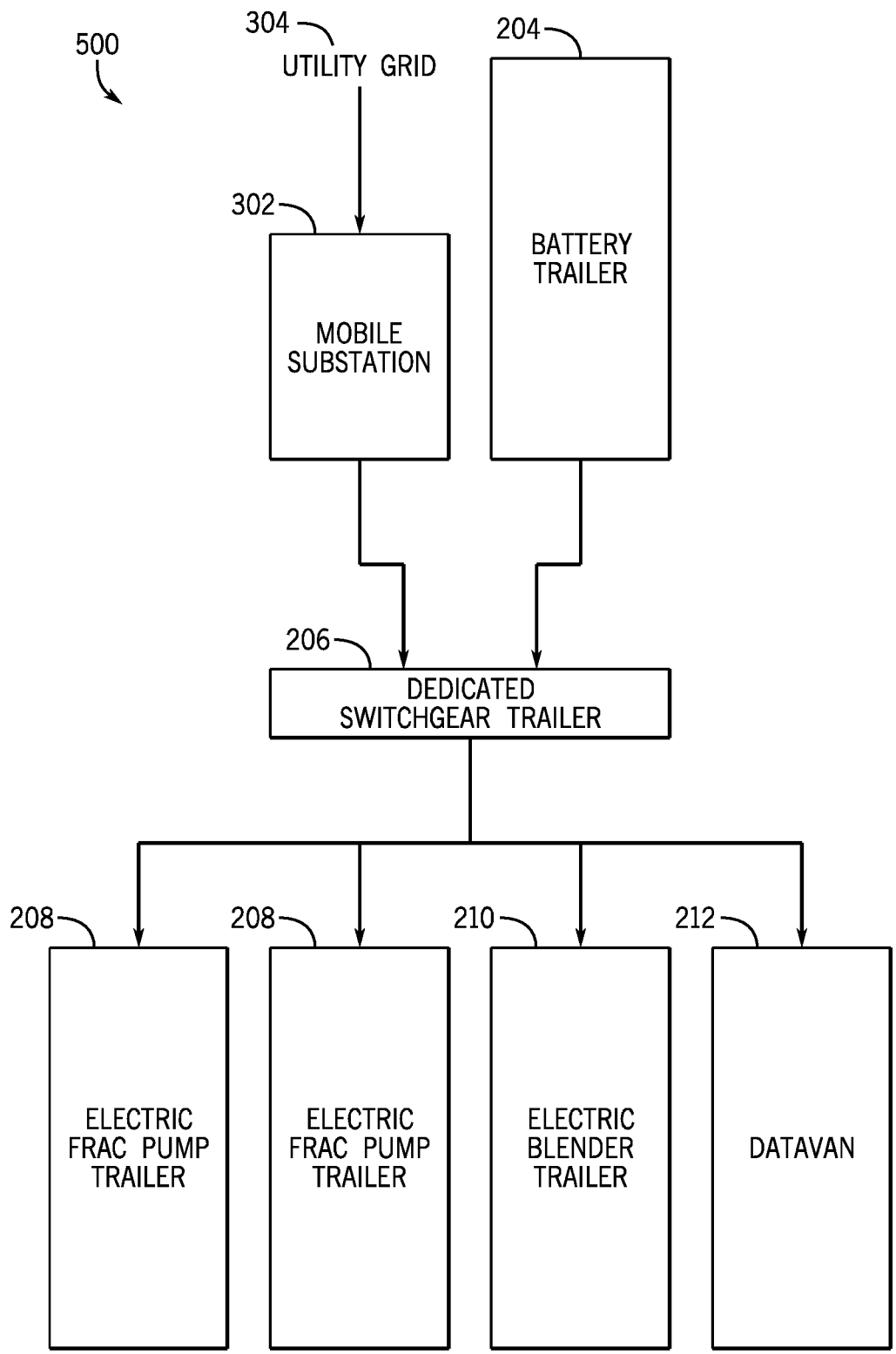
FIG. 5 is a schematic diagram of an embodiment of a fracturing system, in accordance with embodiments of the present disclosure.

FIG. 5 is a schematic diagram of an embodiment of a fracturing system 500 that may be utilized as described herein. This example may share several components with FIGS. 2 and 4, however, the mobile substation 302 has replaced the generator 402 of FIG. 4. Moreover, similar to FIG. 3, the mobile substation 302 may receive operative power from the utility grid 304. As noted above, the mobile substation 302 may act as a primary, secondary, backup, or reserve power source that may provide energy to one or more of the operating equipment and/or the battery trailer 204. For example, the mobile substation 302 may provide energy to charge the battery trailer 204, where the energy may be provided either continuously/semi-continuously as a trickle charge or upon determination that power levels within the battery trailer 204 are below a threshold, among other options. Additionally, the mobile substation 302 may be used to provide energy to the equipment, such as the pump trailers 208, blender trailer 210, data van 212, and the like. It should be appreciated that the mobile substation 302 may act as the primary power source, with the battery trailer 204 providing backup power, or may act as a boosting source if power needs exceed capabilities of the battery trailer 204. Additionally, the mobile substation 302 may serve as reserve or backup power when the battery trailer 204 is swapped out, among various other potential configurations.

In at least one embodiment, utility lines may be available at the well site. In the event that utility power cannot provide enough continuous power (such as utility lines or local substations having too low of a capacity) the battery trailer 204 can be used to supplement the system. In this case, the utility connection can provide electrical power for: low power operations such as equipment baking (drying VFDs/motors), pressure testing, prime up, maintenance periods, or equipment standby, trickle charging the battery system, and/or supplemental power during peak load demand.

If the local utility grid is capable of providing enough power, the battery system 204 can act as emergency power in the event of a grid outage, or it can charge during periods of low electricity costs and discharge during periods of high electricity costs. The system shown in FIG. 5 could also be used to charge batteries for other nearby electric fleets requiring charged batteries that do not have a utility connection. In addition, a switchgear system with more than three input breakers could use any combination of battery trailers 204, utility connections, and diesel generators to get the best combination of supporting nearby fleets, operational economics, redundancy/reliability, and providing enough electrical power for operations.

Figure 6:
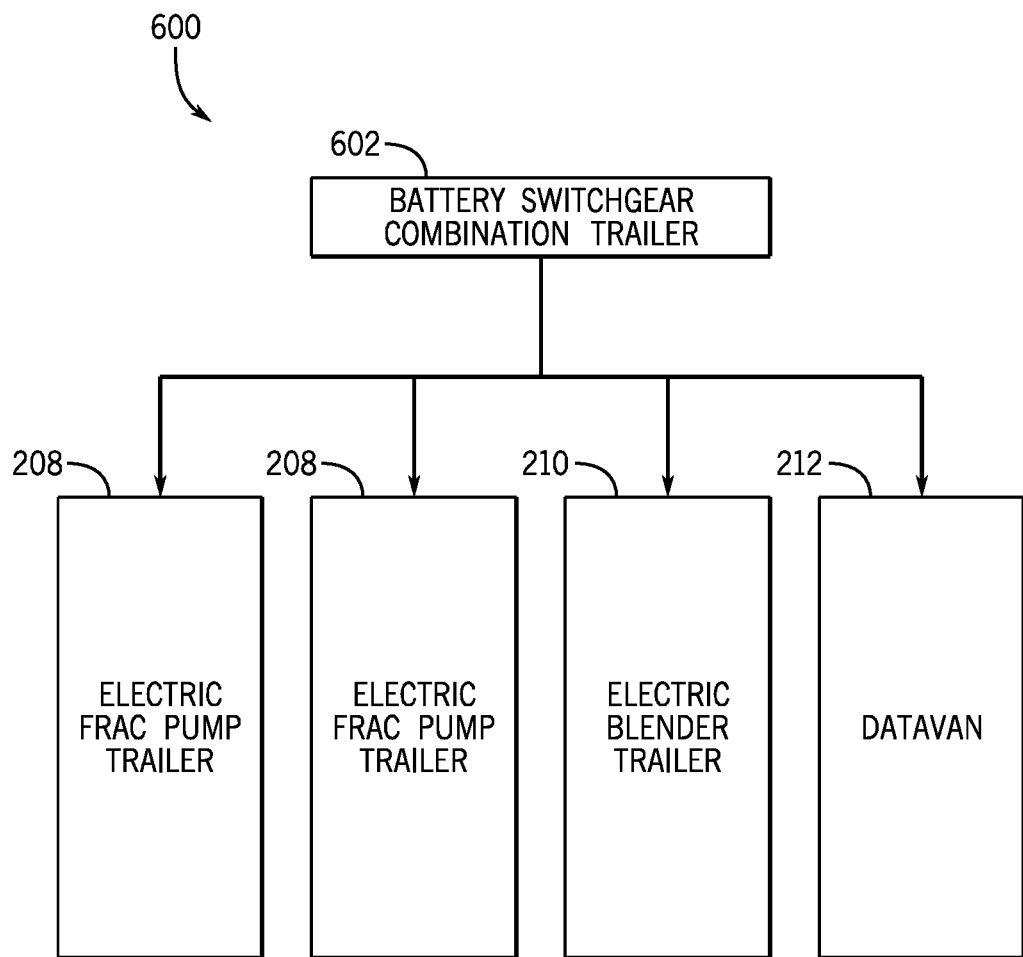
FIG. 6 is a schematic diagram of an embodiment of a fracturing system, in accordance with embodiments of the present disclosure.

FIG. 6 is a schematic diagram of an embodiment of a fracturing system 600 that may be used as described herein. In this example, the battery trailers 204 and the switchgear trailer 208 are integrated into a common combination trailer 602 (e.g., battery switchgear combination trailer).

This trailer 602 may include one or more batteries along with switchgear, and a common bus, among other supporting equipment such as wiring harnesses, climate control equipment, and the like. One advantage to the embodiment of FIG. 6 is the simplicity of the setup, a reduced number of tractors and drivers needed for mobilization, and a reduced overall equipment cost. In this setup, a single trailer can have up to 3 MWHrs of battery along with 5 or more output breakers and at least one breaker for charging the system.

Figure 7:
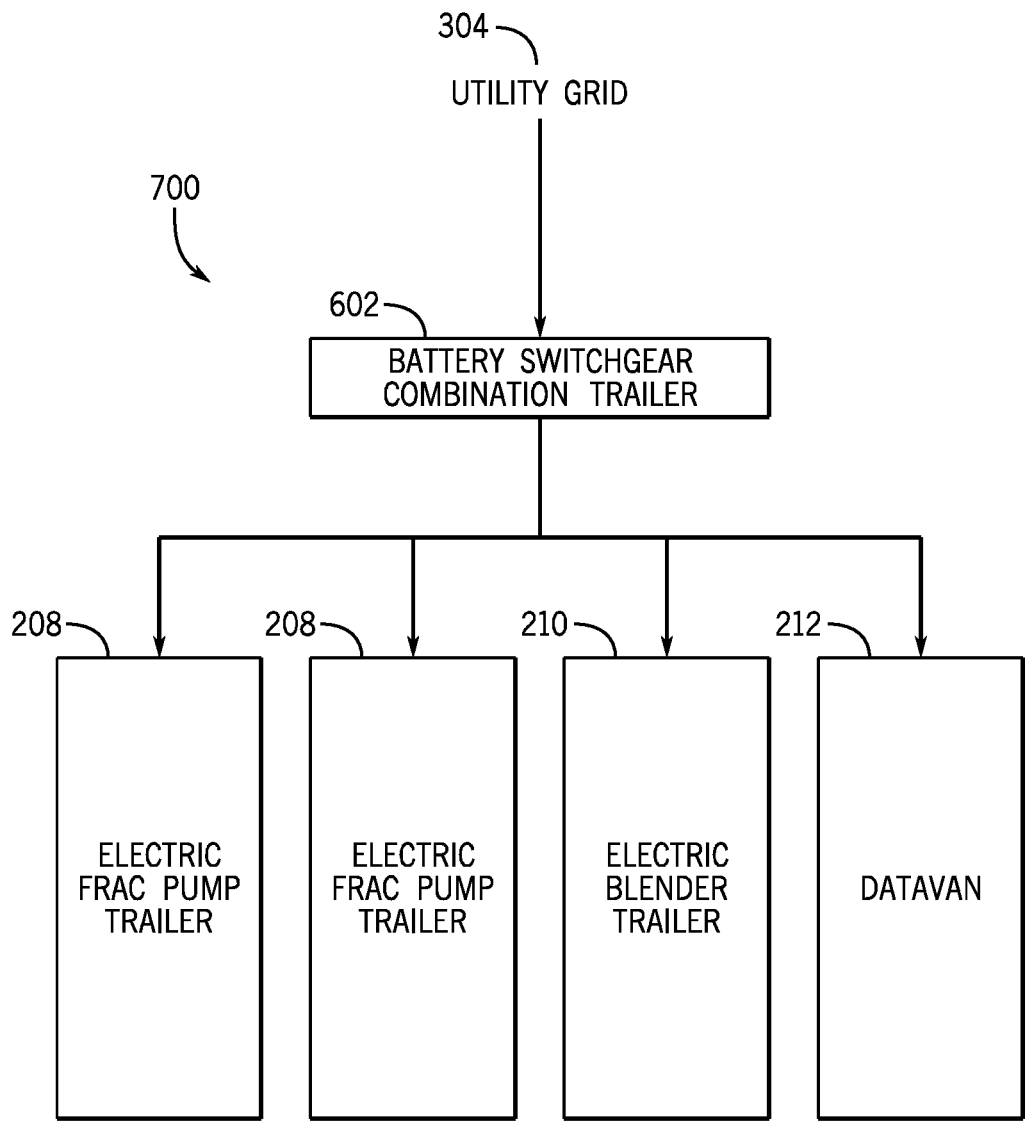
FIG. 7 is a schematic diagram of an embodiment of a fracturing system, in accordance with embodiments of the present disclosure.

FIG. 7 is a schematic diagram of an embodiment of a fracturing system 700 that may be used as described herein. In this example, the battery switchgear combination trailer 602 is electrically coupled to the utility grid 304, similar to the configuration in FIG. 5 with respect to the mobile substation 302. As noted above, the combination trailer 602 may be used for passthrough to provide power to the fracturing equipment without using stored power in the batteries. Additionally, in embodiments, the combination trailer 602 may receive energy to continuously, or intermittently, charge the batteries, while the batteries are used as the primary power source. It should be appreciated that different modes of operation may be used in combination with one another or based, at least in part, on operating conditions or sensor information. By way of example, the combination trailer 602 may be used as the primary power provider for the equipment until a threshold level of charge is remaining in the batteries, at which point primary power may be switched to the utility grid 302 and/or charging may commence for the batteries. In this manner, a backup supply of power may be provided to a reduce a risk of operational upsets.

In at least one embodiment, the battery switchgear combination trailer 602 has a dedicated input breaker (e.g., a utility connection) that allows it to draw power from the utility grid 302. This connection can be used while the battery is providing power to the fracturing equipment. The utility connection can be used to directly power the frac equipment with the batteries in bypass mode, or it can continuously trickle charge the system.

Figure 8:
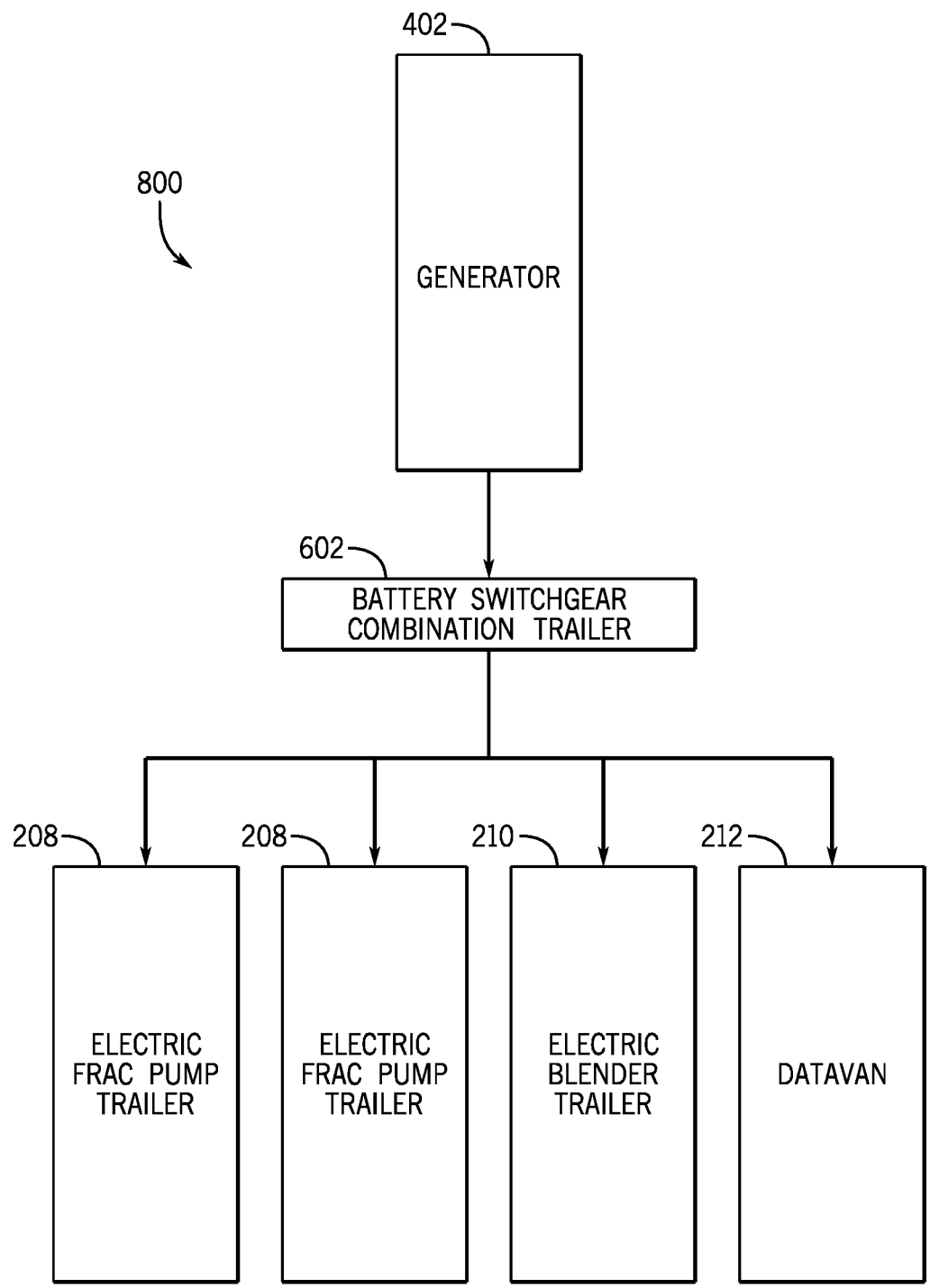
FIG. 8 is a schematic diagram of an embodiment of a fracturing system, in accordance with embodiments of the present disclosure.

FIG. 8 is a schematic diagram of an embodiment of a fracturing system 800 that may be used as described herein. In this example, the battery switchgear combination trailer 602 is electrically coupled to a generator 402, such as a diesel generator, similar to the configuration in FIG. 7 with respect to the utility grid 304. As noted above, the combination trailer 602 may be used for passthrough to provide power to the fracturing equipment without using stored power in the batteries. Additionally, in embodiments, the combination trailer 602 may receive energy to continuously, or intermittently, charge the batteries, while the batteries are used as the primary power source. It should be appreciated that different modes of operation may be used in combination with one another or based, at least in part, on operating conditions or sensor information. By way of example, the combination trailer 602 may be used as the primary power provider for the equipment until a threshold level of charge is remaining in the batteries, at which point primary power may be switched to the generator 402 and/or charging may commence for the batteries. In this manner, a backup supply of power may be provided to a reduce a risk of operational upsets.

In at least one embodiment, the battery switchgear combination trailer 602 has a dedicated input breaker (e.g., a generator connection) that allows it to draw power from the generator 402. It should be appreciated that a variety of different generators may be used within the scope of the present disclosure, such as diesel generators, natural gas generators (e.g., turbines, gas engines, etc.), and the like. This connection can be used while the battery is providing power to the fracturing equipment. The utility connection can be used to directly power the frac equipment with the batteries in bypass mode, or it can continuously trickle charge the system.

Figure 9:
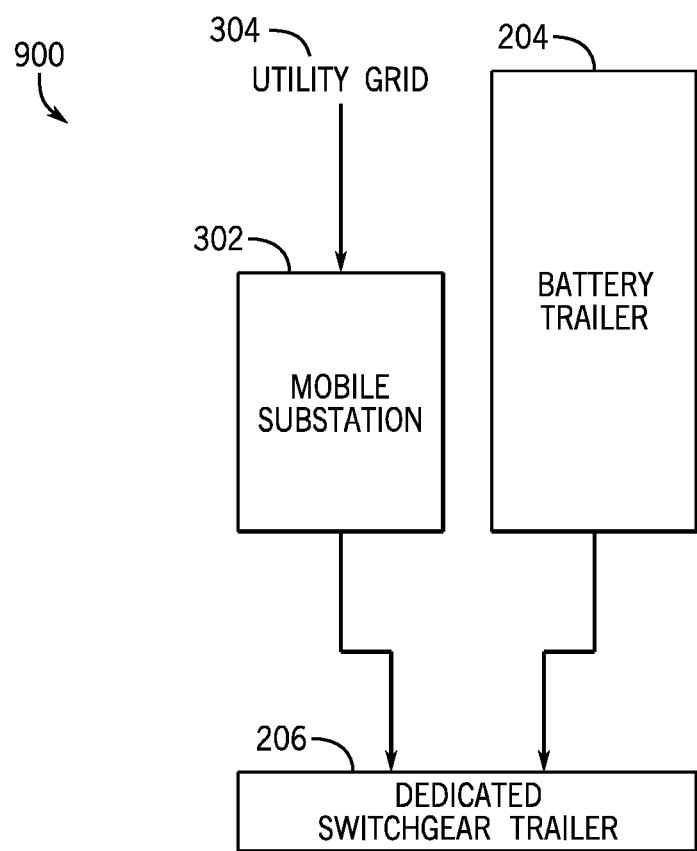
FIG. 9 is a schematic diagram of an embodiment of a charging system, in accordance with embodiments of the present disclosure.

FIG. 9 is a schematic diagram of an embodiment of a charging system 900 that may be utilized as described herein. In this example, a configuration for using a switchgear trailer 206 in between the substation 302 and the battery trailer 204 provides the ability to charge multiple battery trailers 204 without needing extra switchgear on the substation 302 itself. Both the switchgear trailer 206 and the mobile substation 302 can be used in the field on the well site, as described above, or at a local equipment yard for offsite recharging. If the utility grid 304 is not available, a diesel generator can be used in place of the mobile substation 302. Another option would be to use a diesel generator in combination with a utility connection to recharge the battery trailers. This would require more than two breakers and could be very useful if a utility connection had a limitation and a secondary generator could be used to speed up recharge times when required.

The present technology contemplates that 1 C, 2 C, 3 C, and 4 C battery technology can be used. The most economical batteries will be 1C or 2C. For applications in conventional fracturing, 1 C technology may suffice as power capacity in MWHrs will be more important than MW power output. Battery types can include lithium and lithium ion, as well as other battery types as appropriate, including but not limited to Nickel-Cadmium, Nickel-Metal Hydride, and Lead-Acid.

A battery monitoring system (BMS) can be used to constantly monitor individual cell voltage, current, temperature, and control an internal disconnect. This system can also communicate with the control system to shut down the batteries for safety if necessary and will monitor throughout the life of the batteries.

In addition, all equipment discussed herein can be trailer mounted, body load mounted (body on tractor), or skid mounted. Equipment size while on a trailer can be compact, and can be, for example, no larger than 13.5 feet in height by 8.5 feet in width by 53 feet in length. It should be appreciated that larger sizes of trailers and associated equipment may also be used within the scope of the present disclosure, and that various dimensions are provided by way of non-limiting example only. In some circumstances it may be advantageous to reduce battery capacity to allow for shorter battery trailers, such as, for example, 40 feet or even 36 feet. This may aide in mobility from wellsite to wellsite as lease roads for conventional well sites are often very small. In this scenario, an operator or contractor could swap battery trailers more often and would most likely desire a minimum of three dedicated input breakers on the switchgear trailer.

In certain embodiments, liquid cooling using a water/glycol mixture, or air cooling using traditional A/C units for the battery compartments, can be used. Heating will also be installed to keep the battery compartments dry and at proper operating conditions in all types of weather. Throughout this disclosure, diesel generators have been mentioned as an example for non-battery and non-utility power. Small turbines or natural gas reciprocating engines can also be used to drive a generator for standby or recharging power in all those examples.

Furthermore, multitap input transformers can be used in the battery trailers and mobile substations. Most transformers have taps for allowing +/−2.5% and +/−5% voltage adjustments. Larger and more expensive transformers can have taps allowing for widely varying voltages such as 69 KV and 25 KV on the primary side and a secondary side at 13.8 KV with +/−2.5% and +/−5% taps for fine tuning. These can be used to make the mobile substations of the present technology more versatile and compatible with different utility lines.

In at least one embodiment, the battery system 202 is operational in at least one of a pass through mode, a standby mode, a power supply mode, or a charge mode. In a pass through mode, energy from a secondary or alternative source may pass through one or more connections of the trailer without draining or using the energy stored in the batteries. In a standby mode, the battery trailer may be non-operational until receiving a signal indicative that another power supply option is not or will no longer be providing power to fracturing equipment. In a power supply mode, the battery trailer may be providing operational energy to one or more components. In a charge mode, the battery trailer may be receiving power to charge one or more batteries. It should be appreciated that one or more modes of operation may be performed together. For example, the battery trailer may be operating in charge mode and in pass through or power supply mode. Additionally, the battery trailer may be operating in charge mode and standby mode.

Figure 10:
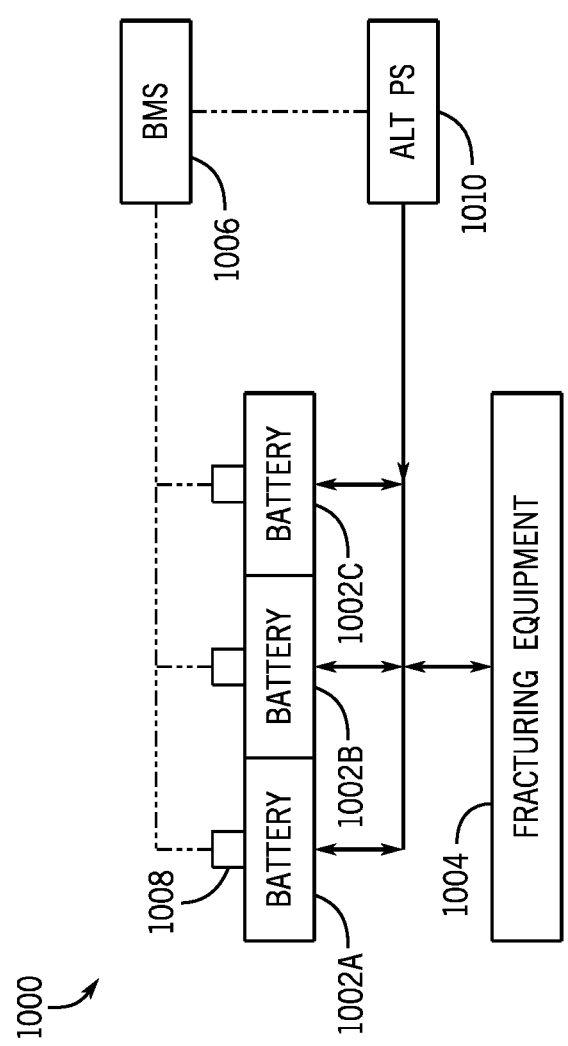
FIG. 10 is a schematic diagram of an embodiment of a fracturing system, in accordance with embodiments of the present disclosure.

FIG. 10 is a schematic diagram of an embodiment of a fracturing system 1000 that may be used with the present disclosure. In this example, the battery system 202, which may include one or more battery trailers 204, may include one or more batteries 1002A-1002N to provide operational energy to fracturing equipment 1004, which may include components such as, but not limited to, the pumping trailer 208, the blending trailer 210, and the data van 212. Furthermore, while not illustrated, various embodiments may also include the switchgear trailer 206 and/or integrate the switchgear with the battery trailer 204.

In this example, a battery monitoring system (BMS) 1006 may receive information from one or more sensors 1008. The sensors 1008 may monitor information such as temperature, remaining charge, battery health, voltage, amperage, electrical faults, and the like. The information may be utilized by the BMS 1006 to determine one or more actions associated with the system, such as to determine one or more batteries 1002A-1002N should be charged. As a result, the BMS 1006 may transmit a signal to an alternative or secondary power source 1010, such as the generator 402 or the utility grid 304, among other options, to either provide energy to charge the batteries 1002A-1002N and/or to provide operational energy to the fracturing equipment 1004.

In at least one embodiment, various rules may be implemented and adjustable to drive operation of the BMS 1006. For example, the operator may set a minimum battery charge level to begin charging. This level may be based, at least in part, on a value that improves or otherwise maintains a useful life of the batteries. Additionally, minimum charges may also be based, at least in part, on a time it takes to engage alternative equipment or swap out battery trailers. In this manner, operations may be continuously monitored and subsequent actions can be planned to reduce a risk of operational upsets.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

I claim:

1. A hydraulic fracturing system, comprising:
   one or more battery trailers having one or more batteries for providing an operational energy to at least one electric-powered fracturing pump; and
   a switchgear system for distributing the operational energy from the one or more battery trailers to fracturing equipment.

2. The hydraulic fracturing system of claim 1, wherein the one or more battery trailers replace at least one of a diesel generator or a mobile substation for providing the operational energy to the at least one electric-powered fracturing pump.

3. The hydraulic fracturing system of claim 1, further comprising:
   at least one fracturing support component receiving operational energy distributed from the switchgear system.

4. The hydraulic fracturing system of claim 1, further comprising:
   an alternative power supply, the alternative power supply configured to provide operational energy to the fracturing equipment or to charge the one or more batteries.

5. The hydraulic fracturing system of claim 1, wherein the one or more battery trailers have a storage capacity between approximately 1 MW hour and 4 MW hours.

6. The hydraulic fracturing system of claim 1, wherein the one or more battery trailers have an output power of between 3 MW and 8 MW.

7. The hydraulic fracturing system of claim 1, further comprising:
   a battery monitoring system to monitor at least one of a battery health or a battery charge level of the one or more batteries.

8. The hydraulic fracturing system of claim 3, wherein the at least one fracturing support component comprises at least one of an electric powered blender or a data van.

9. The hydraulic fracturing system of claim 4, wherein the alternative power supply is at least one of a mobile generator, a mobile substation, a utility grid, or a secondary battery trailer.

10. A hydraulic fracturing system, comprising:
    one or more battery trailers arranged at a well site where hydraulic fracturing is to be performed, the one or more battery trailers each including one or more batteries to store and provide an operational energy at the well site;
    a plurality of hydraulic fracturing components to receive the operational energy from at least the one or more battery trailers, at least some of the plurality of hydraulic fracturing components comprising one or more transformers; and
    a switchgear system positioned electrically between the one or more battery trailers and at least some of the plurality of hydraulic fracturing components.

11. The hydraulic fracturing system of claim 10, wherein the one or more battery trailers have a storage capacity between approximately 1 MW hour and 4 MW hours.

12. The hydraulic fracturing system of claim 10, wherein the one or more battery trailers have an output power of between 3MW and 8MW.

13. The hydraulic fracturing system of claim 10, wherein the operational energy from the one or more battery trailers is transmitted as alternating current (AC) power.

14. The hydraulic fracturing system of claim 10, further comprising:
    a utility grid connection; and
    a mobile substation electrically positioned between the utility grid connection and the one or more battery trailers;
    wherein energy received from the utility grid is conditioned and transmitted to the one or more battery trailers to charge the one or more batteries.

15. The hydraulic fracturing system of claim 10, wherein the one or more battery trailers are operational in at least one of a pass through mode, a standby mode, a power supply mode, or a charge mode.

16. The hydraulic fracturing system of claim 14, wherein the mobile substation is further coupled to at least some of the plurality of hydraulic fracturing components to provide the operational energy to at least some of the plurality of hydraulic fracturing components, via the switchgear system, independent from the one or more battery trailers.

17. A method, comprising:
    positioning one or more dedicated battery trailers having one or more batteries to provide an operational energy to hydraulic fracturing equipment at a charging location, the charging location including at least one of a hydraulic fracturing site or an equipment staging location off-site from the hydraulic fracturing site; and
    causing an electrical energy to be transmitted to the one or more batteries to increase a charge of the one or more batteries, the electrical energy being provided from one or more of a utility power source or an on-site power generator.

18. The method of claim 17, wherein the electrical energy is transmitted to the one or more batteries while the one or more batteries provide the operational energy to the one or more connected components.

19. The method of claim 17, wherein the on-site power generator is at least one of a diesel generator, a gas engine, a gas turbine, or a mobile power station coupled to a utility connection.

20. The method of claim 17, further comprising:
    causing electrical energy to be transmitted to the hydraulic fracturing equipment from one or more of the utility power source or the on-site power generator.

* * * * *